United States Patent

Chilton et al.

[11] Patent Number: 5,902,480
[45] Date of Patent: *May 11, 1999

[54] DEPTH MEDIA IN-TANK FUEL FILTER WITH EXTRUDED MESH SHELL

[75] Inventors: Hugh G. Chilton, Findlay; William L. Zehnpfennig, North Baltimore, both of Ohio

[73] Assignee: Kuss Corporation, Findlay, Ohio

[*] Notice: This patent is subject to a terminal disclaimer.

[21] Appl. No.: 08/855,387

[22] Filed: May 13, 1997

[51] Int. Cl.⁶ .................................................. B01D 35/027
[52] U.S. Cl. .......................... 210/317; 210/461; 210/484; 210/486; 210/490; 210/505
[58] Field of Search ..................................... 210/172, 232, 210/314, 317, 335, 461, 486, 489, 491, 496, 505, 484, 490

[56] References Cited

U.S. PATENT DOCUMENTS

| | | | |
|---|---|---|---|
| 2,911,101 | 11/1959 | Robinson | 210/458 |
| 3,826,372 | 7/1974 | Bell | 210/172 |
| 4,036,758 | 7/1977 | Combest | 210/223 |
| 4,604,203 | 8/1986 | Kyle | 210/489 |
| 4,645,600 | 2/1987 | Filippi | 210/416.4 |
| 4,663,222 | 5/1987 | Ohue et al. | 428/224 |
| 4,853,123 | 8/1989 | Hayes et al. | 210/316 |
| 4,961,850 | 10/1990 | Combest | 210/232 |
| 5,252,203 | 10/1993 | Lyda | 210/172 |
| 5,283,106 | 2/1994 | Seiler et al. | 428/198 |
| 5,294,482 | 3/1994 | Gessner | 428/287 |
| 5,358,638 | 10/1994 | Gershenson | 210/448 |
| 5,509,950 | 4/1996 | van de Graff et al. | 55/486 |
| 5,543,047 | 8/1996 | Stoyell et al. | 210/493.2 |
| 5,547,568 | 8/1996 | Sasaki | 210/172 |
| 5,552,048 | 9/1996 | Miller et al. | 210/489 |
| 5,620,785 | 4/1997 | Watt et al. | 428/219 |
| 5,716,522 | 2/1998 | Chilton et al. | 210/317 |

*Primary Examiner*—Peter A. Hruskoci
*Attorney, Agent, or Firm*—Brinks Hofer Gilson & Lione

[57] ABSTRACT

An in-tank fuel filter includes a body having upper and lower panels comprising an outer shell or layer of extruded mesh, layers of spun bonded and melt blown filtration media and a fitting for mounting the filter to an in-tank fuel pump inlet. The outer layer of the body is extruded mesh material that has the general appearance of a woven fabric but includes connections at every filament intersection. This outer layer protects the finer, inner filtration layers which include a first layer of spun bonded material, a layer of melt blown filtration media defining smaller pore sizes and a second layer of spun bonded material. The mounting fitting is made of a fuel compatible material and may either be a multiple part device or be in-situ molded on one of the filter panels. Separating ribs or a stuffer may be disposed in the interior of the filter to prevent its collapse and improve fuel withdrawal through the mounting fitting.

21 Claims, 3 Drawing Sheets

DEPTH MEDIA IN-TANK FUEL FILTER WITH EXTRUDED MESH SHELL

BACKGROUND OF THE INVENTION

The invention relates generally to in-tank fuel filters and more specifically to an in-tank fuel filter having layers of spun bonded and melt blown filtration media and an outer shell of extruded mesh.

The modular assembly approach to motor vehicle manufacture increasingly demanded and practiced by automobile manufacturers has effected the design and componentry of motor vehicles in numerous ways. With regard to fuel systems, and particularly the fuel supply and filtration components, fuel filters have changed from a single, in-line assembly typically disposed under the hood and adjacent the carburetor, such as disclosed in U.S. Pat. No. 4,036,758, to modular designs wherein a filter, fuel pump and fuel level sensor constitute an assembly which is disposed within and secured to the fuel tank. Such an in-tank filter is described in U.S. Pat. No. 4,961,850.

Typically, such in-tank filters comprise a single layer of a woven nylon, polyester or acetal fabric which is folded and sealed by heat, radio frequency or ultrasonic energy along its edges. In order to improve small particulate filtration capability, the exterior woven fabric layer may be supplemented by an interior non-woven layer having finer pores which provide improved small particulate filtration capability. Given the comparative pore sizes of the outer and inner layers and the particulate filtration capability required of such filters, the exterior layer, in fact, provides little from the standpoint of filtration. Rather, it is present primarily to provide a suitably durable protective covering for the non-woven interior layers.

Such protection is also necessary because such in-tank filters are disposed either on the end of a suction tube or directly at the inlet of an in-tank fuel pump. In order to achieve the maximum withdrawal of fuel from the tank, the filter is positioned, and in some installations pressed, against the bottom surface of the fuel tank. In this condition, the lower surface of the fuel filter is subjected to abrasive action due to the small though inevitable relative movement between the filter and the bottom surface of the fuel tank.

The present invention addresses problems associated with this type of filter installation, achieves the small particulate filtration capability of melt blown filtration media and exhibits excellent abrasion resistance due to the incorporation of an extruded mesh outer shell.

SUMMARY OF THE INVENTION

An in-tank fuel filter includes a body having upper and lower panels each comprising an outer shell or layer of extruded mesh, one or more layers of spun bonded and melt blown filtration media and a fitting for mounting the filter to an in-tank fuel pump inlet. The outer layer of the panel is extruded mesh material that has the general appearance of a woven fabric but includes connections at every filament intersection. This outer layer protects the finer, inner filtration layers which include a first layer of spun bonded material, a layer of melt blown filtration media defining smaller pore sizes and a second layer of spun bonded material. The spun bonded material acts as a relatively coarse filter of particulates and the one or more layers of melt blown material filter finer particulates thereby providing graduated or staged, i.e., depth media, filtration.

The mounting fitting is made of a fuel compatible material and may either be a multiple part device or be in-situ molded on one of the filter panels. Separating ribs or a stuffer may be disposed in the interior of the filter to prevent its collapse and improve fuel withdrawal through the mounting fitting.

Three alternate embodiments of the filter body panels include the outer layer of extruded mesh and various combinations of spun bonded and melt blown filtration materials.

It is thus an object of the present invention to provide an in-tank fuel filter having an outer shell of extruded mesh.

It is a further object of the present invention to provide an in-tank fuel filter having one or more layers of non-woven filtration media.

It is a still further object of the present invention to provide an in-tank fuel filter having an outer layer of extruded mesh and one or more inner layers of spun bonded and melt blown filtration media.

It is a still further object of the present invention to provide an in-tank fuel filter which exhibits excellent abrasion resistance when situated in contact with the bottom of a fuel tank.

It is a still further object of the present invention to provide an in-tank fuel filter which exhibits excellent dimensional and shape stability due to the outer shell of extruded mesh having welds at every filament intersection.

It is a still further object of the present invention to provide an in-tank fuel filter having a plurality of non-woven layers of filtration media with the layers arranged to provide staged or graduated filtration.

It is a still further object of the present invention to provide an in-tank fuel filter having a multi-part or in-situ molded fitting and a spacer or stuffer assembled therewith.

Further objects and advantages of the present invention will become apparent by reference to the following description of the preferred embodiment and appended drawings wherein like reference numbers refer to the same feature, element or component.

DESCRIPTION OF THE PREFERRED AND ALTERNATE EMBODIMENTS

Figure 1:
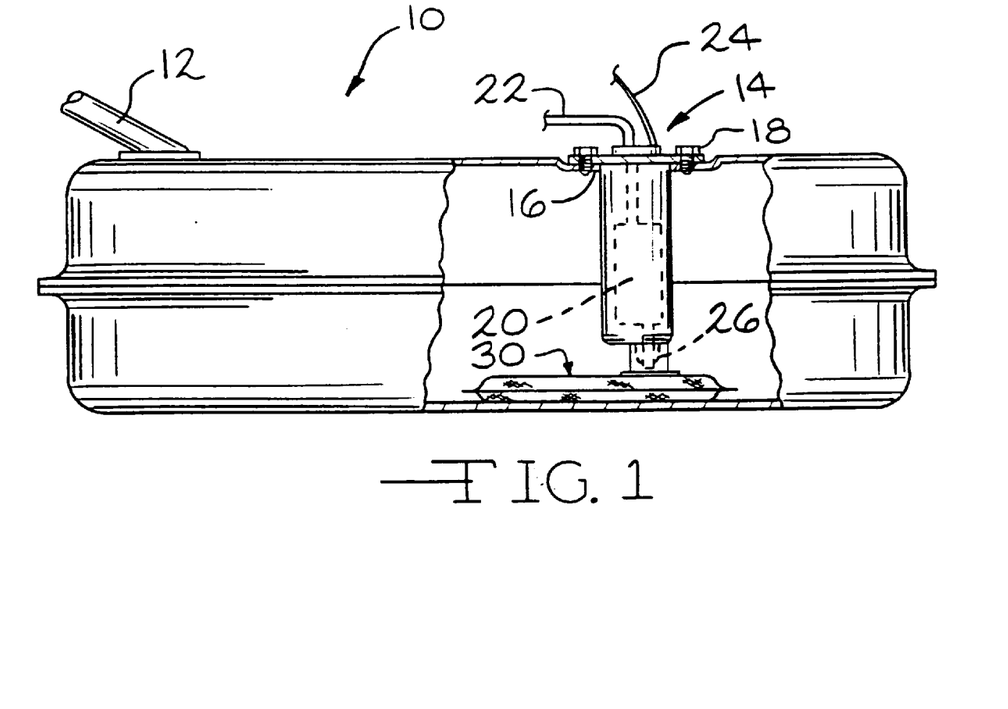
FIG. 1 is a diagrammatic, side elevational view, with portions broken away, of a vehicle fuel tank including an in-tank fuel filter according to the present invention.

Referring now to FIG. 1, a typical vehicle fuel tank is illustrated and generally designated by the reference numeral 10. The vehicle fuel tank 10 is typically fabricated of formed, welded metal, blow molded plastic or a similar substantially rigid and fuel resistant material. The vehicle fuel tank 10 includes an inlet or filler tube 12 which receives fuel such as gasoline, gasohol, diesel fuel or other, alternative fuel from a source exterior to the vehicle (not illustrated) and directs it to the interior of the vehicle fuel tank 10 as will be readily understood. The vehicle fuel tank 10 also typically includes an electric fuel pump module 14 which is sealingly mounted within an opening 16 in the vehicle fuel tank 10 and may be secured thereto by a plurality of threaded fasteners 18 or other securement means. The electric fuel pump module 14 preferably includes an electric fuel pump 20 and may include a fuel level sensor assembly (not illustrated). The fuel pump 20 provides fuel under pressure to a fuel outlet or supply line 22 which communicates with the engine (not illustrated) of the vehicle. An electrical cable 24 having one or two conductors provides electrical energy to the fuel pump 20 in accordance with conventional practice.

Figure 2:
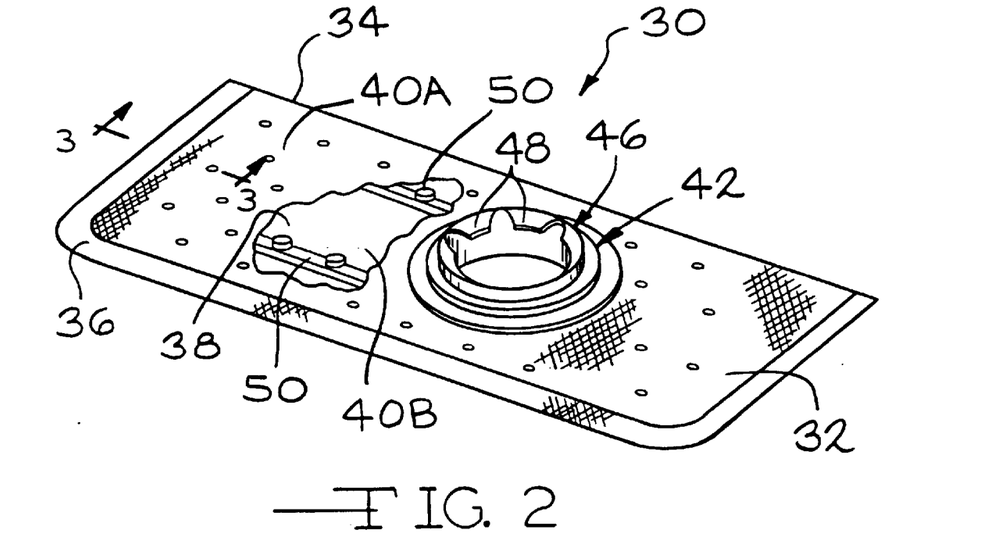
FIG. 2 is a perspective view of an in-tank fuel filter having layers of extruded mesh and non-woven filtration media according to the present invention.

Referring now to FIGS. 1 and 2, the electric fuel pump module 14 also includes a depending, preferably hollow cylindrical suction or inlet fitting 26 which defines an inlet opening in fluid communication with the suction side of the fuel pump 20. The cylindrical inlet fitting 26 receives and retains an in-tank fuel filter assembly 30 according to the present invention.

The in-tank fuel filter assembly 30 includes a body 32 comprising a preferably folded swatch of multi-layer or composite filtration media having a single elongate fold line 34 and a partial peripheral seam or seal 36. The body 32 is preferably rectangular and may be formed of a single swatch of composite filtration media folded along the fold line 34. Three of the edges may include an edge or peripheral seam or seal 36. Alternatively, the body 32 may define a triangular, other polygonal shape (e.g., square, pentagonal or hexagonal) having N edges or an irregular shape with at least one straight edge, in which case one edge is folded and the N-1 remaining edges, or non-folded regions, are closed by a seam or seal 36. As a further alternative, the body 32 may comprise a pair of equal size filtration media swatches of any convenient or desired regular shape such as round or oval or irregular shape which may be sealed together entirely around their aligned, adjacent peripheries along an edge seal 36. In any case, the body 32 forms an interior space 38 which, but for an outlet fitting, is closed and comprises a first or upper composite panel 40A and a second or lower composite panel 40B.

Generally centrally disposed on the first or upper composite panel 40A of the fuel filter assembly 30 is an outlet fitting 42 which is preferably circular and includes a spring metal mounting and retaining washer 46 having a plurality of circumferentially arranged radial inwardly extending spring tabs 48. The mounting and retaining washer 46 removably or semi-permanently secures the fuel filter assembly 30 to the inlet fitting 26 of the fuel pump 20. Alternatively, spring clips, mounting ears, latches or retaining tabs formed on the outlet fitting 42 may cooperate with complementarily configured features on the inlet fitting 26 to secure the fuel filter 30 thereto.

The outlet fitting 42 is preferably fabricated of nylon or other fuel tolerant and impervious material such as acetal or polyester and is preferably molded in-situ on the upper composite panel 40A of the fuel filter assembly 30. The outlet fitting 42 may also be assembled from two or more interengageable parts. Also preferably molded in-situ to the second or lower composite panel 40B of the fuel filter assembly 30 are one or more runners, ribs or separators 50 having sufficient internal height above the interior (upper) surface of the lower panel 40B to maintain separation of the interior surfaces of the upper and lower composite panels 40A and 40B of the filter assembly 30 such that the interior space 38 is maintained and fuel flow therebetween and into the outlet fitting 42 is facilitated. Alternatively, of course, the runners, ribs or separators 50 may be in-situ molded, either with or independently of the outlet fitting 42, on the first or upper composite panel 40A to achieve such separation and facilitate fuel flow.

Figure 3:
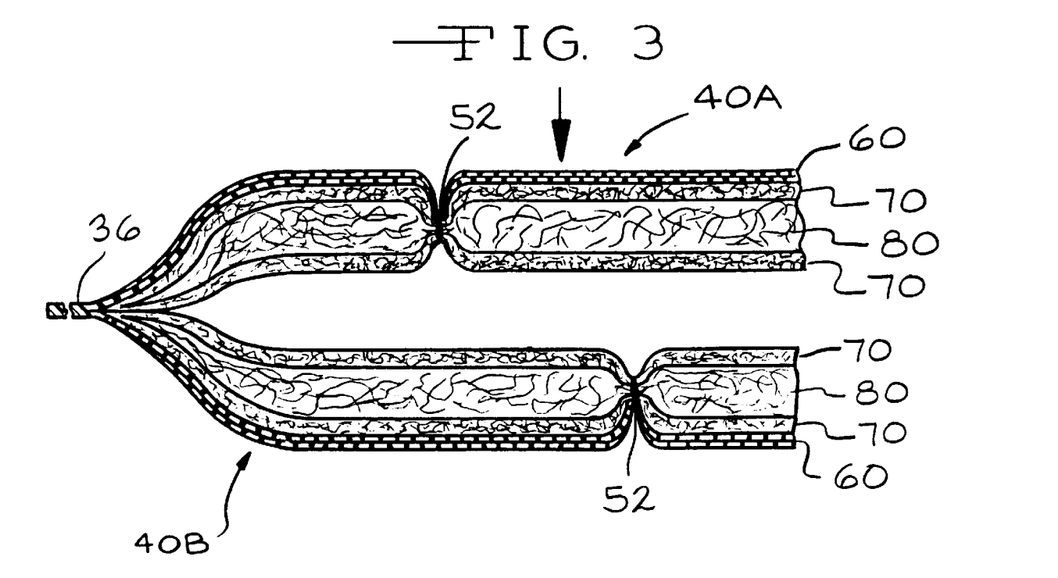
FIG. 3 is a fragmentary, enlarged, cross sectional view of the upper and lower panels of an in-tank fuel filter according to the present invention taken along line 3—3 of FIG. 2.

In FIG. 3, a cross sectional view of the upper panel 40A and the lower composite panel 40B of the filter assembly 30 is presented. It should be understood that while the composite panels 40A and 40B are identical, they are oriented oppositely or in mirror image, i.e., the top (outside) layer of the upper composite panel 40A is the same as the bottom (outside) layer of the lower composite panel 40B and so on. Thus, while only the upper composite panel 40A of the preferred and alternate embodiments will be specifically described herein, it should be appreciated that, with the foregoing qualification, the description of one applies equally to the other. Furthermore, both the upper and lower composite panels 40A and 40B are preferably sonically point-bonded to provide spaced apart regions of connected or coupled filaments evidenced by the compressed regions 52 illustrated in FIGS. 2 and 3.

The upper composite panel 40A preferably includes at least four distinct layers of material. The outer, that is, upper, exterior shell or layer 60 is a relatively coarse extruded mesh of any suitable fuel tolerant and impervious material, e.g. nylon, polyester, acetal or Teflon. Teflon is a registered trademark of the E. I. DuPont de Nemours Co. The relative coarseness means that the exterior layer 60 contributes relatively little to the fuel filtration process except on the largest scale. Rather, the extruded mesh of the exterior layer 60 provides an exceptionally stable and abrasion resistant outer covering for the fuel filter assembly 30.

Figure 4:
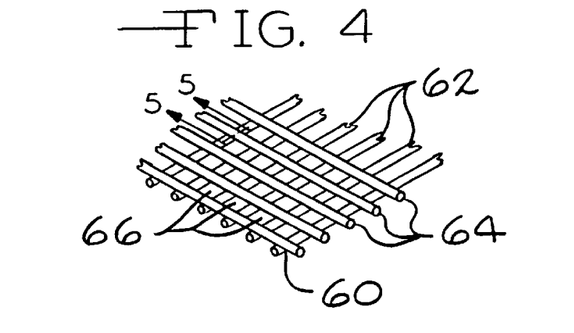
FIG. 4 is a enlarged, fragmentary, perspective view of the outer shell or layer of extruded mesh of an in-tank fuel filter according to the present invention.
Figure 5:
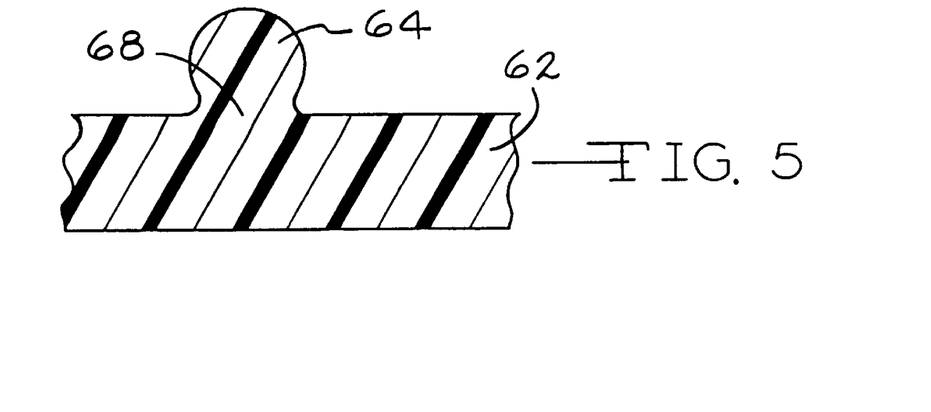
FIG. 5 is a greatly enlarged, fragmentary, sectional view of the extruded mesh outer shell of an in-tank fuel filter according to the present invention taken along line 5—5 of FIG. 4.

Such characteristics are best understood with reference to FIG. 4 and 5. Although the mesh of the exterior layer 60 is extruded, it has the appearance of a woven fabric with warp filaments 62, woof filaments 64 and uniform interstices 66. In fact, the uniformity of the interstices 66 is extraordinarily high because the warp filaments 62 and woof filaments 64 are connected or integrally formed at each intersection 68 as shown in FIG. 5. This results in the exterior shell or layer 60 of extruded mesh having exceptional dimensional stability due its resistance to pantographing and ruggedness due to the strength of the mesh and its excellent abrasion resistance. As used here, the term pantographing refers to the tendency or ability of swatches of woven material to distort and collapse like a pantograph when sides of the swatch are pulled or pushed. The interstices 66 in the extruded mesh exterior layer 60 are diamond shaped and preferably about 500 microns by 900 microns. This opening size is not critical, however, and the size may readily be varied by 25 percent or more.

Turning again to FIG. 3, a pair of fine, non-woven filtration layers 70 are preferably spun bonded nylon filaments but may be spun bonded polyester, acetal, Teflon or other stable, fuel impervious material. As utilized herein, the terms spun bonded filaments and spun bonded filtration media refer to that class of non-woven materials wherein the filaments are cooled by the application of cold air immediately upon forming to stop attenuation thereof.

Typically, the diameters of such spun bonded filaments will be on the order of 100 microns but may readily range from between 50 and 200 microns. Each layer 70 illustrated in FIG. 3 preferably has a nominal uncompressed thickness on the order of 0.5 millimeters though such thickness may vary from less than about 0.25 millimeters to up to about 1 millimeter or thicker depending upon production and application variables.

Disposed within the two layers 70 of spun bonded material is a center or intermediate layer 80 of finer, melt blown filaments. As utilized herein, the terms melt blown filaments and melt blown filtration media refer to that class of non-woven materials wherein the filaments are maintained at an elevated temperature by the application of hot air immediately upon forming to encourage attenuation thereof.

Typically, melt blown filaments are on the order of ten times smaller than spun bonded filaments and thus are nominally 10 microns in diameter and may readily be in the range of 5 to 20 microns. The melt blown filaments may also be nylon, polyester, acetal, Teflon or other stable, fuel impervious material. The center or intermediate layer 80 of melt blown filaments preferably has a nominal uncompressed thickness of 1 millimeter but may vary from less than 0.5 millimeters to 2 millimeters or thicker.

The upper and lower panels 40A and 40B of the preferred embodiment fuel filter assembly 30 thus each include an outer or exterior layer or shell 60 of extruded mesh and two layers 70 of spun bonded material having a first, larger filament size sandwiching an intermediate layer 80 of melt blown filaments having filament sizes which are approximately one magnitude smaller. The interstitial or pore sizes of the layers 70 and 80 are correspondingly larger and smaller. This graduated pore size has the effect of first filtering out larger particulate matter in the first layer 70 of spun bonded material and then filtering out smaller particulate matter in the center or intermediate layer 80 of melt blown filaments. As noted, due to the relatively large size of the pores or interstices 66 of the extruded mesh outer layer 60, it contributes to the filtration process only on the largest scale. This staged or graduated arrangement of filtration filaments and pore sizes is referred to as depth media and the graduated or staged filtration of particulate matter therethrough is referred to as depth media filtration.

Figure 6:
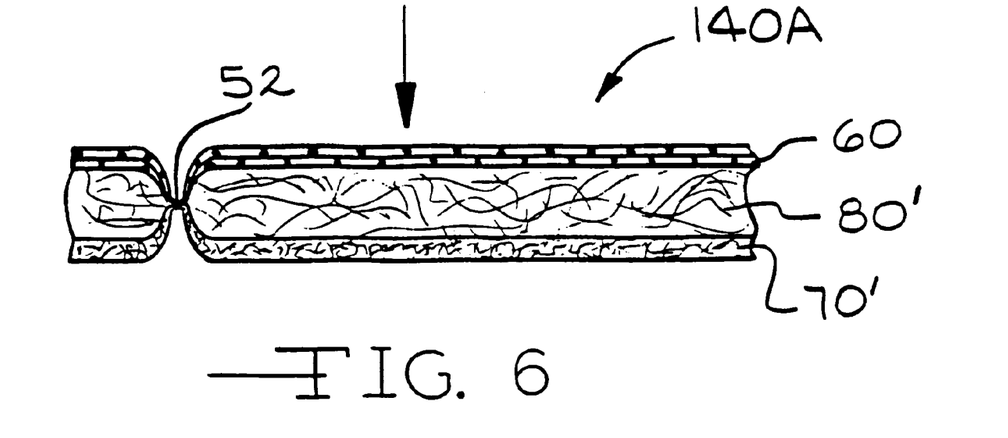
FIG. 6 is a fragmentary, enlarged, cross sectional view of the outer shell and layers of filtration media of one panel of a first alternate embodiment of an in-tank fuel filter according to the present invention.

Referring now to FIGS. 2 and 6, a first alternate embodiment of the preferred embodiment upper composite panel 40A is illustrated and designated by the reference number 140A. It will be appreciated that the first alternate embodiment upper composite panel 140A will be used with a lower composite panel (not illustrated) of the same configuration to form a filter assembly of the same general construction as the fuel filter assembly 30. That is, the first alternate embodiment upper composite panel 140A will be disposed in mirror image adjacent a lower composite panel such that the fuel flow through each panel is in the direction of the arrow in FIG. 6. A suitable seal such as the seal 36 is effected about its open edges to form a filter body such as the filter body 32 which includes a suitable outlet fitting such as the outlet fitting 42 disposed thereon.

Figure 7:
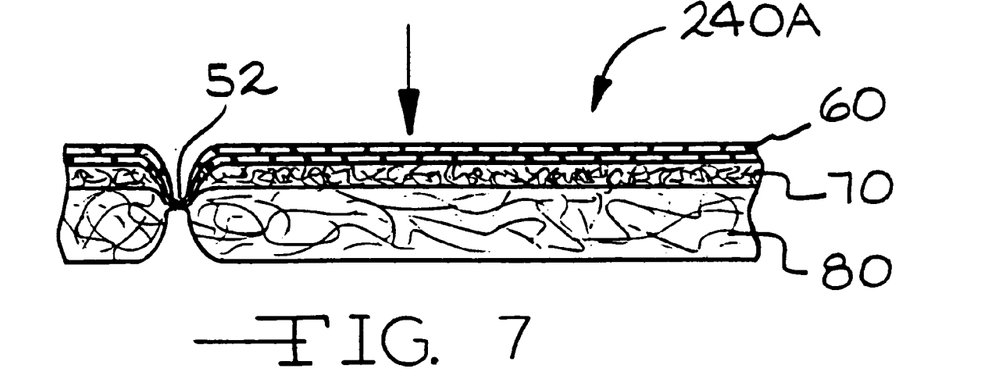
FIG. 7 is a fragmentary, enlarged, cross sectional view of the outer shell and layers of filtration media of one panel of a second alternate embodiment of an in-tank fuel filter according to the present invention.
Figure 8:
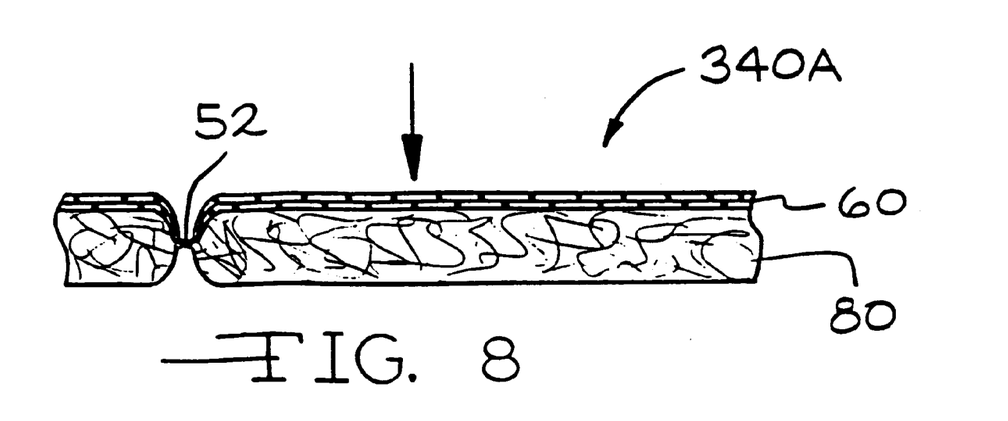
FIG. 8 is a fragmentary, enlarged, cross sectional view of the outer shell and layer of filtration media of one panel of a third alternate embodiment of an in-tank fuel filter according to the present invention.

It should be understood that the second alternate embodiment upper composite panel 240A illustrated in FIG. 7 and the third alternate embodiment upper composite panel 340A illustrated in FIG. 8 are likewise disposed adjacent a lower composite panel in mirror image to form a fuel filter assembly such as the preferred embodiment fuel filter assembly 30 such that the fuel flow through each upper and lower panel is in the direction of the arrows in FIGS. 7 and 8.

The first alternate embodiment composite panel 140A includes an exterior layer 60 of extruded mesh as described above which provides good ruggedness and excellent abrasion resistant on the exterior of the filter. The interior, i.e., innermost, layer of the composite panel 140A is a fine, non-woven layer 70' of spun bonded nylon filaments. The layer 70' of spun bonded filaments may also be polyester, acetal, Teflon or other stable, fuel tolerant material. Disposed between the exterior, extruded mesh layer 60 and the interior layer 70' of spun bonded filaments is a center or intermediate layer 80' of finer, melt blown filaments. The sizes of the filaments of the interior layer 70' and the intermediate layer 80' are preferably in the ranges disclosed above with regard to the preferred embodiment upper composite panel 40A. The first alternate embodiment composite panel 140A preferably also includes a plurality of sonically point-bonded, compressed regions 52, one of which is illustrated in FIG. 6, which improve the overall strength, integrity and dimensional stability of the composite panel 140A. It will be appreciated that a fuel filter assembly utilizing the first alternate embodiment upper composite panel 140A and a similarly configured lower composite panel provides a somewhat simpler and therefore less expensive depth media filtration fuel filter which provides substantially the same minimum particulate size filtration capabilities and service life as the preferred embodiment fuel filter assembly 30.

Referring now to FIG. 7, the second alternate embodiment upper composite panel 240A is illustrated. The second alternate embodiment upper composite panel 240A is similar to the first alternate embodiment upper composite panel 140A except for the rearrangement or exchange of the interior and intermediate layers 70 and 80 of the panel 140A such that are in the order of the preferred embodiment upper composite panel 40A. That is, the second alternate embodiment upper composite panel 240A includes an exterior extruded shell or layer 60 of extruded mesh of any suitable stable and fuel tolerant material such as nylon, polyester, acetal or Teflon such as described above. A second, intermediate layer 70 includes non-woven spun bonded nylon filaments but may also be filaments of polyester, acetal, Teflon or other stable, fuel tolerant material. Finally, a third interior layer 80 comprises very fine melt blown filaments of nylon or the other materials listed directly above. The sizes of the filaments of the interior layer 70 and the intermediate layer 80 are preferably in the ranges disclosed above with regard to the preferred embodiment upper composite panel 40A. Again, the layers 60, 70 and 80 which comprise the upper composite panel 240A are preferably sonically point-bonded at a plurality of spaced apart compressed regions 52, one of which is illustrated in FIG. 7. And again, a filter assembly utilizing the second alternate embodiment upper composite panel 240A and a similarly configured lower composite panel provides substantially the same minimum particulate filtration capability and service life as the preferred embodiment filter.

Referring now to FIG. 8, the third alternate embodiment upper composite panel 340A is illustrated. The third alternate embodiment upper composite panel 340A comprehends but two of the layers described above with regard to the preferred and alternate embodiments. Specifically, the third alternate embodiment upper composite panel 340A includes an exterior shell or layer 60 of extruded mesh of any suitable stable and fuel tolerant material as described above. The second, interior layer 80 of the upper composite panel 340A is very fine melt blown filaments such as the melt blown filaments described above with regard to the preferred embodiment upper composite panel 40A. Again, the upper composite panel 340A preferably includes a plurality of spaced apart point-bonded sites such as the compressed regions 52. In the third alternate embodiment upper composite panel 340A, the ruggedness and abrasion resistance of the extruded panel 60 is coupled to the minimum particulate size filtration capability of the very fine filaments of the second, interior layer 80. Thus, this is the least complex of the various embodiments of the filtration panels, although it provides the two most necessary features.

The primary benefit of these structures and their filtration mode is improved service life in that only particulate matter above a certain size is filtered out by the first filtration material, for example, the layers 70 of spun bonded material, which allows the passage of smaller particulate matter which is then trapped by the smaller pore size of the layer 80 of melt blown material. Such staged or depth media filtration has the effect of increasing the surface area of the filter as a given region and its surface area function to filter only a specific band or range of particulate sizes. This greatly increases the capacity of the fuel filter assembly 30 to retain particulate matter. In this regard, it should be appreciated that, for example, the layer 80 of melt blown material may itself comprise two or more layers of graduated filament size and thus pore size to achieve depth filtration within this layer. That is, the layer, 80 may include a first distinct layer of melt blown material with filaments having a diameter of 25 microns and, a second, adjacent layer of melt blown filaments having a diameter of 4 microns. In the preferred embodiment upper and lower composite panels 40A and 40B, two layers 70 of spun bonded material fully encapsulate and contain the finer filaments of the intermediate layer 80 of melt blown filaments thereby preventing migration of the exceedingly fine melt blown filaments into the fuel and fuel system of the vehicle. In the first alternate embodiment, the layer 70' of spun bonded filaments contains the finer melt blown filaments of the intermediate layer 80'.

This configuration of graduated filament size provides excellent depth media filtration, wherein the fuel is subjected to finer and finer filament size and thus smaller and smaller pore (interstitial) size. Thus, staged or depth related removal of smaller and smaller particulate matter from the fuel is achieved. As noted above, such staged or depth media filtration greatly improves the particulate retention capacity of the fuel filter 30 and the service life of such filters inasmuch as each region or layer of depth media or graduated filtration material is exposed to increasingly smaller particulate sizes and only traps particulates of a size relating to the filament and pore (interstitial) size, larger particulates having been trapped by previous larger filaments and pore (interstitial) sizes and smaller particulates and contaminants traveling through to be trapped by subsequent finer filaments and smaller pore (interstitial) sizes.

The foregoing disclosure is the best mode devised by the inventors for practicing this invention. It is apparent, however, that filtration devices incorporating modifications and variations will be obvious to one skilled in the art of fuel filtration. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

We claim:

1. An in-tank fuel filter assembly comprising, in combination,
    a filter body having first and second panels of filtration media defining an edge and providing an interior space between said first and said second panels of filtration media a peripheral seal along at least a portion of said edge,
    said first and said second panels of filtration media comprising an outer layer of extruded mesh, a pair of layers of spun bonded filtration media and an inner layer of melt blown filtration media disposed between said pair of layers of spun bonded filtration media, and
    a fitting secured to said first panel of filtration media for providing fluid communication with said interior space.

2. The in-tank fuel filter of claim 1 wherein said filter body is formed of a folded swatch of multi-layer filtration media.

3. The in-tank fuel filter of claim 1 wherein said filtration media is nylon, polyester, acetal or Teflon.

4. The in-tank fuel filter of claim 1 wherein said spun bonded filtration media comprises filaments having diameters in the range of 50 to 200 microns and said melt blown filtration media comprises filaments having diameters in the range of 5 to 20 microns.

5. The in-tank fuel filter of claim 1 wherein said melt blown media is fully contained within said spun bonded media thereby preventing migration of said melt blown media.

6. The in-tank fuel filter of claim 1 wherein said fitting includes a resilient ring for securing said fuel filter to a fuel inlet.

7. The in-tank fuel filter of claim 1 wherein said first and second panels of filtration media are point-bonded.

8. The in-tank fuel filter of claim 1 wherein said outer layer of extruded mesh defines extruded filaments and includes bonds at a plurality of filament intersections.

9. A depth media fuel filter assembly comprising, in combination,
    a closed body of filtration media having an interior and an exterior, said closed body having a first composite panel of filtration media and a second composite panel of filtration media, each of said composite panels of filtration media comprising an outer layer of extruded mesh and at least one inner layer of filtration material of one of spun bonded and melt blown filaments, and
    an opening in said body for providing fluid communication with the interior of said body.

10. The depth media fuel filter assembly of claim 9 wherein said closed body includes a folded edge and at least two sealed edges.

11. The depth media fuel filter assembly of claim 9 wherein said layers of filtration media are point-bonded.

12. The depth media fuel filter assembly of claim 9 further including a mounting fitting secured to said filter body about said opening.

13. The depth media fuel filter assembly of claim 12 wherein said mounting fitting includes a spring retainer for securing said filter assembly to an inlet fitting.

14. The depth media fuel filter assembly of claim 9 wherein said spun bonded material has a filament size of about 100 microns and said melt blown material has a filament size of about 10 microns.

15. The depth media fuel filter assembly of claim 9 wherein spun bonded and melt blown material is nylon, polyester, acetal or Teflon.

16. The depth media fuel filter assembly of claim 9 wherein said extruded mesh includes filaments defining bonded intersections between adjacent filaments.

17. A in-tank fuel filter assembly comprising, in combination,
- a body of filtration media having an interior and an exterior, said body having a first panel of filtration media and a second panel of filtration media, each of said panels of filtration media comprising a sandwich of an outer layer of extruded mesh, a region of spun bonded material and a region of melt blown material disposed adjacent said region of spun bonded material,
- an opening in said body for providing fluid communication with said interior of said body, and
- a fitting secured to said body about said opening for securing said filter assembly to an inlet fitting.

18. The in-tank fuel filter assembly of claim 17 wherein said closed body includes a folded edge and at least two sealed edges.

19. The in-tank fuel filter assembly of claim 17 wherein said mesh includes filaments defining intersections and said intersections include a bond between said filaments.

20. The in-tank fuel filter of claim 17 wherein said spun bonded filtration media comprises filaments having diameters in the range of 50 to 200 microns and said melt blown filtration media comprises filaments having diameters in the range of 5 to 20 microns.

21. The in-tank fuel filter assembly of claim 17 wherein said spun bonded material has a filament size of about 100 microns and said melt blown material has a filament size of about 10 microns.

* * * * *

(12) EX PARTE REEXAMINATION CERTIFICATE (8119th)
United States Patent
Chilton et al.

(10) Number: US 5,902,480 C1
(45) Certificate Issued: Mar. 29, 2011

(54) DEPTH MEDIA IN-TANK FUEL FILTER WITH EXTRUDED MESH SHELL

(75) Inventors: Hugh G. Chilton, Findlay, OH (US); William L. Zehnfennig, North Baltimore, OH (US)

(73) Assignee: Cummins Filtration IP, Inc., Minneapolis, MN (US)

Reexamination Request:
No. 90/009,678, Apr. 1, 2010

Reexamination Certificate for:
Patent No.: 5,902,480
Issued: May 11, 1999
Appl. No.: 08/855,387
Filed: May 13, 1997

(51) Int. Cl.
*B01D 29/11* (2006.01)
*B01D 29/01* (2006.01)
*B01D 35/027* (2006.01)
*B01D 35/00* (2006.01)
*F02M 37/22* (2006.01)

(52) U.S. Cl. ............ 210/317; 210/461; 210/484; 210/486; 210/490; 210/505

(58) Field of Classification Search .......... None
See application file for complete search history.

(56) References Cited

U.S. PATENT DOCUMENTS

| | | | |
|---|---|---|---|
| 2,911,101 A | 11/1959 | Robinson | |
| 3,826,372 A | 7/1974 | Bell | |
| 4,036,758 A | 7/1977 | Combest | |
| 4,536,440 A | 8/1985 | Berg | |
| 4,604,203 A | 8/1986 | Kyle | |
| 4,645,600 A | 2/1987 | Filippi | |
| 4,663,222 A | 5/1987 | Ohue et al. | |
| 4,689,058 A | 8/1987 | Vogt et al. | |
| 4,807,619 A | 2/1989 | Dyrud et al. | |
| 4,827,924 A | 5/1989 | Japuntich | |
| 4,853,123 A | 8/1989 | Hayes et al. | |
| 4,925,560 A | 5/1990 | Sorrick | |
| 4,961,850 A | * 10/1990 | Combest | ........ 210/232 |
| 5,252,203 A | 10/1993 | Lyda | |
| 5,283,106 A | 2/1994 | Seiler et al. | |
| 5,294,482 A | 3/1994 | Gessner | |
| 5,358,638 A | 10/1994 | Gershenson | |
| 5,395,520 A | 3/1995 | Ito et al. | |
| 5,496,627 A | 3/1996 | Bagrodia et al. | |
| 5,509,950 A | 4/1996 | van de Graaff et al. | |

(Continued)

FOREIGN PATENT DOCUMENTS

| DE | 9320069 | 3/1994 |
|---|---|---|
| EP | 582 286 | 2/1994 |
| EP | 878 226 | 11/1998 |
| JP | 9-506305 | 6/1997 |
| JP | 10-113508 | 5/1998 |
| JP | 10-118430 | 5/1998 |
| WO | 92/11405 | 7/1992 |
| WO | 97/46800 | 12/1997 |

OTHER PUBLICATIONS

Machine Design, Fuel filter Increases Pump Life, p. 52, Jun. 6, 1944.*
Filtration & Separation, Progress in Automotive Fuel Filters, p. 715, Sep. 19, 1996.*

*Primary Examiner*—Stephen J Stein (57) ABSTRACT

An in-tank fuel filter includes a body having upper and lower panels comprising an outer shell or layer of extruded mesh, layers of spun bonded and melt blown filtration media and a fitting for mounting the filter to an in-tank fuel pump inlet. The outer layer of the body is extruded mesh material that has the general appearance of a woven fabric but includes connections at every filament intersection. This outer layer protects the finer, inner filtration layers which include a first layer of spun bonded material, a layer of melt blown filtration media defining smaller pore sizes and a second layer of spun bonded material. The mounting fitting is made of a fuel compatible material and may either be a multiple part device or be in-situ molded on one of the filter panels. Separating ribs or a stuffer may be disposed in the interior of the filter to prevent its collapse and improve fuel withdrawal through the mounting fitting.

U.S. PATENT DOCUMENTS

| | | | | |
|---|---|---|---|---|
| 5,543,047 A | * | 8/1996 | Stoyell et al. | 210/493.2 |
| 5,547,568 A | | 8/1996 | Sasaki | |
| 5,552,048 A | | 9/1996 | Miller et al. | |
| 5,620,785 A | | 4/1997 | Watt et al. | |
| 5,665,229 A | * | 9/1997 | Fitzpatrick et al. | 210/232 |
| 5,702,237 A | | 12/1997 | Hill | |
| 5,716,522 A | * | 2/1998 | Chilton et al. | 210/317 |
| 5,928,507 A | | 7/1999 | Chiga | |

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-8 and 17-21 is confirmed.

Claims 9-16 are determined to be patentable as amended.

New claim 22 is added and determined to be patentable.

9. [A] *An in-tank* depth media fuel filter assembly comprising, in combination,
   a closed body of filtration media having an interior and an exterior, said closed body having a first composite panel of filtration media and a second composite panel of filtration media, each of said composite panels of filtration media comprising an outer layer of extruded mesh and at least one inner layer of filtration material of one of spun bonded and melt blown filaments, and an opening in said body for providing fluid communication with the interior of said body.

10. The *in-tank* depth media fuel filter assembly of claim 9, wherein said closed body includes a folded edge and at least two sealed edges.

11. The *in-tank* depth media fuel filter assembly of claim 9 wherein said layers of filtration media are point-bonded.

12. The *in-tank* depth media fuel filter assembly of claim 9 further including a mounting fitting secured to said filter body about said opening.

13. The *in-tank* depth media fuel filter assembly of claim 12 wherein said mounting fitting includes a spring retainer for securing said filter assembly to an inlet fitting.

14. The *in-tank* depth media fuel filter assembly of claim 9 wherein said spun bonded material has a filament size of about 100 microns and said melt blown material has a filament size of about 10 microns.

15. The *in-tank* depth media fuel filter assembly of claim 9 wherein spun bonded and melt blown material is nylon, polyester, acetal or Teflon.

16. The *in-tank* depth media fuel filter assembly of claim 9 wherein said extruded mesh includes filaments defining bonded intersections between adjacent filaments.

*22. The in-tank fuel assembly of claim 17 wherein the first and second panels of filtration media are point-bonded.*

\* \* \* \* \*